March 13, 1951 — A. W. KAMMERER — 2,545,034
EXPANSIBLE ROTARY DRILL BIT AND METHOD OF ASSEMBLING AND DISASSEMBLING THE SAME
Filed Oct. 13, 1947 — 2 Sheets-Sheet 2
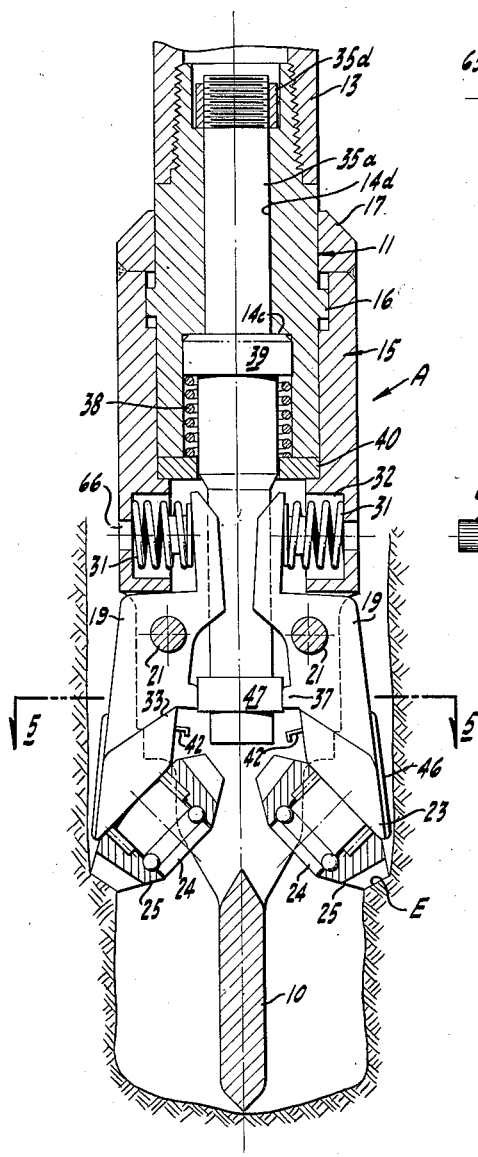
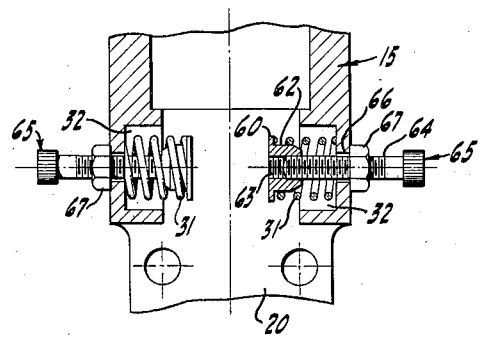
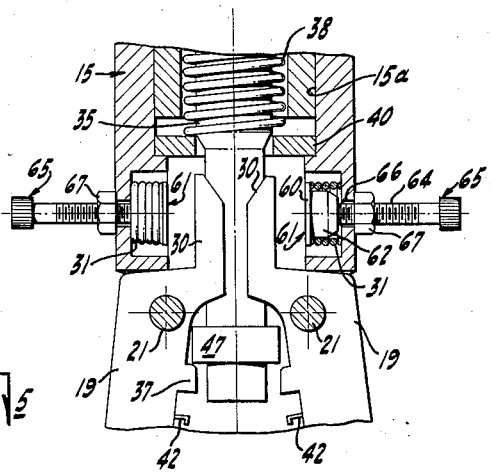
INVENTOR.
Archer W. Kammerer
BY Bernard Kriegel
ATTORNEY Patented Mar. 13, 1951

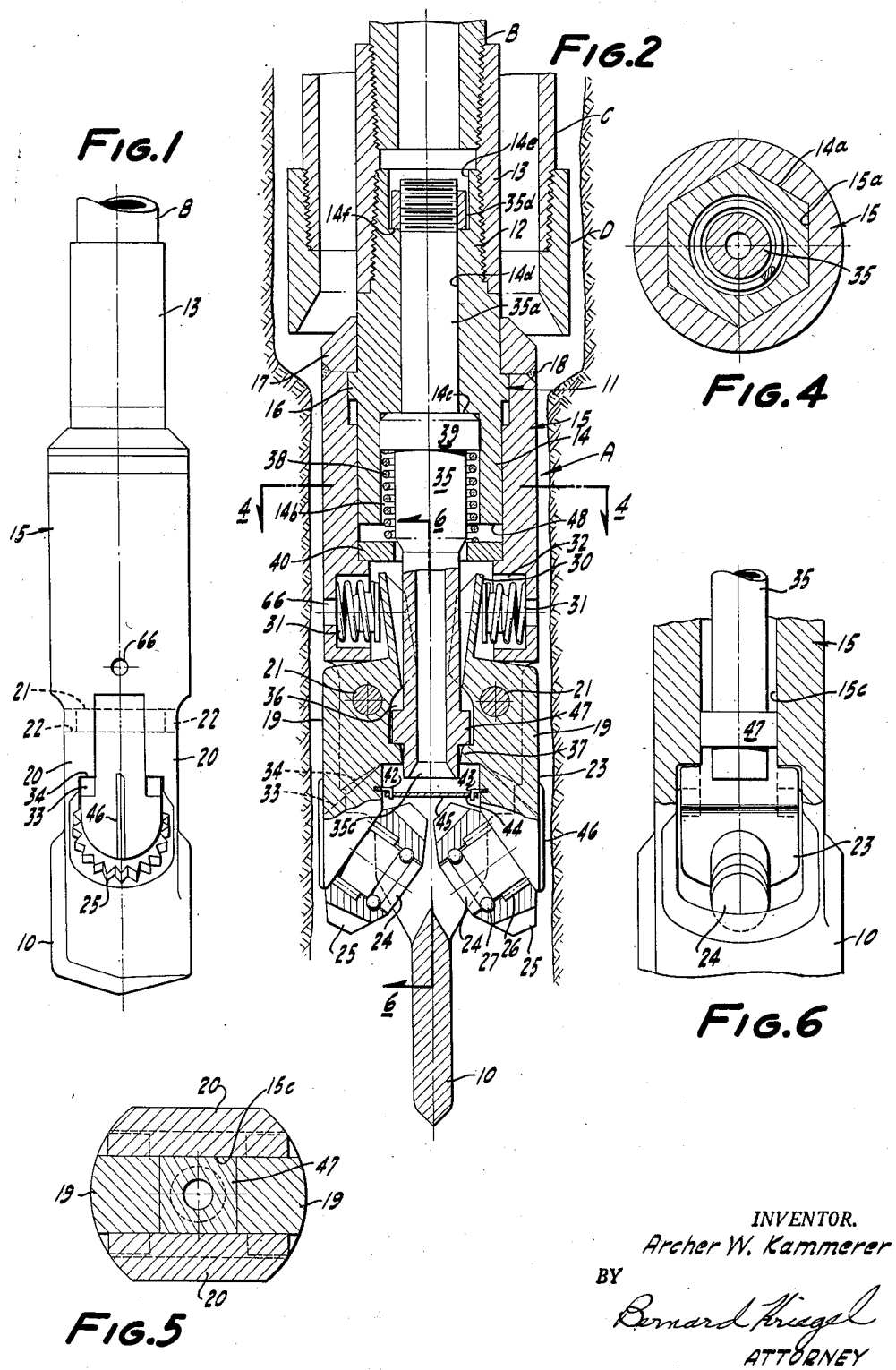

2,545,034

UNITED STATES PATENT OFFICE 2,545,034

EXPANSIBLE ROTARY DRILL BIT AND METHOD OF ASSEMBLING AND DISASSEMBLING THE SAME

Archer W. Kammerer, Fullerton, Calif.

Application October 13, 1947, Serial No. 779,592

10 Claims. (Cl. 255—76)

This invention relates to drill bits, and more particularly to rotary bits of the expansible type for drilling or reaming holes below well casing greater in diameter than the inside diameter of the casing through which the bit is capable of passing.

This invention is continuation-in-part of my applications for "Rotary Drill Bits," Serial No. 597,744, filed June 6, 1945, now Patent No. 2,466,991, and "Expansible Rotary Drill Bits," Serial No. 686,806, filed July 29, 1946. Certain features disclosed herein are also disclosed and claimed in my co-pending application Serial No. 779,591, filed October 13, 1947.

The expansible rotary drill bits described in the above applications include compressed springs for urging the bit cutters outwardly to their fully expanded positions. These springs exert a comparatively large expansive force on the cutters, which necessitates their compression to a comparatively high degree in assembling the tool.

It is an object of the present invention to provide a drill bit whose cutters are expanded outwardly by a spring device which is capable of being readily stressed, in order to facilitate assembly of the drill bit.

Another object of the invention is to provide a drill bit having cutters expanded by springs which can be readily compressed in the bit by simple, readily portable and available hand tools, allowing the bit to be assembled and dismantled at the well location, if desired, avoiding the need for providing special tools or equipment.

A further object of the invention is to provide a method of assembling and disassembling a spring operated expansible rotary drill bit in a more rapid and facile manner.

The invention has other objects which will become apparent from a consideration of the embodiment shown in the drawings accompanying and constituting part of the present specification. This form, and the manner of assembling and disassembling it, will now be described in detail to illustrate the general principles of the invention, but it is to be understood that such detailed description is not to be taken in a limited sense, since the scope of the invention is best defined by the appended claims.

Referring to the drawings:

Fig. 1 is a side elevation of one form of drill bit embodying the invention.

Fig. 2 is a longitudinal section through the drill bit, on an enlarged scale, with parts shown in retracted position for lowering through the well bore.

Fig. 3 is a view similar to Fig. 2, with the parts shown in expanded position.

Fig. 4 is a cross-section taken along the line 4—4 on Fig. 2.

Fig. 5 is a cross-section taken along the line 5—5 on Fig. 3.

Fig. 6 is a partial longitudinal section taken along the line 6—6 on Fig. 2.

Fig. 7 is a partial longitudinal section illustrating the manner of assembling the springs in the drill bit.

Fig. 8 is a view similar to Fig. 7, illustrating a further step in the assembly of the component parts of the tool.

As shown in the drawings, the rotary drill bit A is attached to a string of drill pipe B by means of which it is lowered through a well casing C in a well bore to a point below the casing shoe D at which enlargement of the bore hole is to commence. The drill bit preferably has a pilot bit 10 at its lower end for centering the bit in hole that may already have been drilled, or for drilling the central portion of new hole in the absence of preexisting hole. The main portion of the bit is capable of enlarging the hole by producing and operating upon a formation shoulder E, as hereinafter described.

The upper end of the bit consists of a driving mandrel 11 whose upper pin 12 is threadedly connected to a sub 13 forming the lower end of the drill pipe string B. This mandrel includes an upper kelly or drill stem member 14, slidably splined to the main body 15 of the bit. As disclosed in the drawing, the exterior 14a of the kelly is hexagonal in shape and is telescopically received in a companion hexagonal socket 15a in the body. The mandrel has a limited range of longitudinal movement within the body, upward movement being limited by engagement of an external shoulder 16 on the kelly with a retainer ring 17 at the upper end of the body, suitably secured thereto, as by use of welding material 18.

The body 15 has a plurality of expansible parts mounted on it, comprising opposed cutter supporting members 19, 19 located within a transverse body slot 15c defined by bifurcated body arms 20, 20, the members 19 being pivotally carried on pivot or hinge pins 21, 21, suitably secured to the arms 20, as by use of welding material 22. Each cutter supporting member consists of a depending leg 23 having a bearing supporting pin 24 inclined inwardly and downwardly, and on which a roller side cutter 25 is rotatably mounted. Anti-friction roller and ball bearing element 26, 27 are preferably placed between each cutter 25 and bearing pin 24, the roller bearings 26 transmitting radial thrusts and the ball bearings 27 both radial and axial thrusts.

Each cutter supporting member 19 also includes an upwardly extending arm 30 engaging the base 60 of a spring retainer 61, against which an elastic expander 31 bears. This expander, in the form of a compressed coil spring, is received within a retainer pocket 32 in the body 15, and exerts its force against the retainer 61 and arm 30, tending to swing the latter inwardly and thus urge the cutter 25, on the other side of the fulcrum pin 21, in an outward direction. The extent of this outward movement is limited by engagement of stop shoulders 33, 33 on opposite sides of the cutter supporting member 19 with cooperable body stop shoulders 34, 34.

After the cutters 25 have been expanded outwardly by the expander springs 31 to their maximum extent, they can be locked in this position by a tubular member 35, forming part of the mandrel 11 and piloted in the kelly 14. The member 35 is provided with a lock portion 47, movable from an upper position in transverse alignment with inner supporting member recesses 36, permitting retraction of the cutters, to a lower position opposite lugs 37 formed on and projecting inwardly from the supporting member legs 23, preventing retraction of the cutters.

The tubular member 35 is connected in swivel fashion to the kelly 14, to permit relative arcuate or rotary movement therebetween. However, the kelly and tubular member are secured together for joint movement in both longitudinal directions. This is accomplished by providing a shoulder 39 on the tubular member received within a lower socket 14b in the kelly and abutting a companion shoulder 14c in the kelly at the upper end of the socket. The tubular member 35 has an upper portion 35a extending from the shoulder freely through the central bore 14d of the kelly, with the upper terminus of the upper member 35a received within an enlarged recess 14e in the kelly or mandrel pin 12, where a nut 35d is threaded on the terminal portion and bears against the base 14f of the upper pin recess 14e.

The arrangement between the tubular member 35 and kelly 14 is such that downward movement is transmitted from the kelly to the tubular member through the abutting shoulders 14c, 39, while upward movement is transmitted to the tubular member through engagement of the recess shoulder 14f with the nut 35d. However, the nut 35d does not serve to clamp the tubular member 35 to the kelly 14 and allows relative rotary movement therebetween.

The mandrel 11 is normally held in its upper position with respect to the main body 15 of the bit and the supporting members 19 by a helical retractor spring 38 encircling the tubular members 35, with its upper end engaging the mandrel shoulder 38 and its lower end engaging a spring seat 40 at the lower end of the hexagonal body socket 15a, the spring seat serving as an upper bearing guide for the tubular mandrel member 35.

Circulating fluid can pass downwardly through the string of drill pipe B and through the tubular mandrel 11 for ejection from its lower discharge nozzle 35c, and onto the cutters 25, to cleanse them of cutting and flush the latter from the drilling area to the top of the well bore. The circulating fluid is also available to unlatch the cutter supporting members 19, in the event it is desired to first hold them positively in retracted position, as described hereinafter.

A positive lock may be provided by securing a hook 42 to the inner portion of each cutter supporting member and inserting the ends 43 of these hooks in holes 44 in a strip 45 extending across the outlet 35c of the mandrel. The cutting tool A, after being lowered in retracted position to the point at which the reaming operation is to commence, may be released for operation by starting the pumps at the surface of the well bore, which will force fluid down through the drill string B and mandrel 11 and impinge it upon the latch strip 45, blowing or forcing it off the hook ends 43 and permitting the spring expanders 31 to shift the supporting arms 30 inwardly and the cutters 25 outwardly against the formation.

In the operation of the device, the tool A is mounted on the lower end of the drill string B, with its parts held in retracted position by the latch strip 45, as shown in Fig. 2. In this position of operation, the compressed retractor spring 38 holds the mandrel 11 and its kelly 14 in an upward position with respect to the body 15, as determined by engagement of the kelly shoulder 16 with the body retainer ring 17. With the mandrel so positioned, its lock portion 47 is elevated above the lugs 37 on the cutter supporting members 19, being received within the inner recesses 36 in the supporting members, which permits the latter to be held inwardly against the action of the expander springs 31. The tool is lowered through the well casing C, and upon reaching the position in the well bore below the casing shoe D at which the drilling operation is to begin, the pumps are started at the surface of the well bore and fluid impinged on the latch strip 45, forcing it hydraulically off the ends 43 of the hooks 42 and releasing the cutting supporting members 19 for outward expansion under the influence of the springs 31.

The drill string B is then rotated to rotate the main bit body 15 through the splined kelly and body connection 14a, 15a, the expander springs 31 forcing the arms 30 inwardly and the cutters 25 outwardly against the formation. Rotation is continued without moving the drill string longitudinally until the side cutters 25 enlarge the diameter of the hole to the maximum extent, as determined by the eventual abutting of the supporting member stop shoulders 33 with the companion body stop shoulders 34. Thereafter, the drill string is lowered to cause the formation shoulder E, produced in the well bore by the cutters 25 under the action of the expander springs 31, to support the cutter members 25, 19 and body 15 and prevent their downward movement.

Since the body 15 cannot move downwardly, drilling weight imposed on the drilling string B shifts its connected mandrel 11 downwardly within the body 15 against the action of the retractor spring 38, until the lower end 48 of the kelly 14 engages the spring seat and guide 40. This downward movement also shifts the tubular member 35 downwardly, because of the abutting between the kelly and the tubular member shoulders 14c, 39, to position the mandrel or tubular member lock portion 47 opposite and in alignment with the lugs 37 on the inner portions of the cutter supporting members 19, providing a positive lock by preventing inward movements of the cutters. So long as down weight is imposed on the drill string B and the cutters 25 rest on the formation shoulder E, the cutters are prevented from moving inwardly by engagement of their lugs 37 with the mandrel lock portion 47. It is also to be noted that further outward movement of the cutters beyond the predetermined maximum reaming diameter is prevented by contact between the supporting member shoulders 33 and body shoulders 34, through which the drilling weight is transmitted to the roller cutters 25, thus relieving the hinge pins 21 of this load.

Drilling is continued by rotating the drill bit and imposing the proper drilling weight on the cutters, to cause their removal of the formation material and the reaming of the hole in a downward direction for the desired extent or length. When the drill bit is to be retracted and removed to the top of the well bore, all that need be done is elevate the drill string B, which moves the side cutters 25 above the formation shoulder E and permits the retractor spring 38 to press downwardly on the body 15 and move it, together with the cutter supporting number 19, downwardly with respect to the mandrel 11. This action repositions the mandrel lock portion 47 opposite the supporting member recesses 36 and above their lugs 37, because of the engagement between the pin recess shoulder 14f and tubular member nut 35d, permitting inward swinging of the cutters 25 and their supporting members 19 when the tool passes back into the casing C upon elevation of the drill string. The cutters 25 and their supporting member 19 will ride the wall of the casings C during elevation of the string until the tool is removed from the top of the well bore.

Pads in the form of longitudinal drag reaming blades 46 can be formed at the lower outer surfaces of the cutter supporting member 19, which will ride the inner wall of the casing and prevent the cutter teeth from hanging up in the casing coupling spaces while the tool is being lowered therein. These pads 46 can be provided in addition to the hooks 42 and latch strip 45, or in place of the latter. When the latching device is used, the tool can be lowered through open hole below the casing shoe D to as far a distance as desired before the reaming operation commences. If the latch is not provided, downward movement of the drill string B is stopped when the bit passes out of the shoe D, and the drill pipe B and bit A rotated to allow the cutters 25 to produce the formation shoulder E under the influence of the compressed expander springs 31. Drilling in the downward direction can then proceed, as aforementioned, with the drill string B and mandrel 11 lowered against the action of the retractor spring 38 to position the lock portion 47 opposite the lugs 37 and prevent inward movement of the cutters until the drilling weight is removed from tool.

For the purpose of facilitating assembly and disassembly of the tool, the spring seat and retainer 61 has the aforementioned base portion 60 against which the inner end of the spring 31 bears, and a central guide portion 62 for holding the turns of the spring in alignment with each other. The retainer 61 also has a central internally threaded bore 63 adapted to receive the threaded shank 64 of a bolt 65, which can extend freely through a hole 66 provided in the base portion of each spring socket 32. The bolt 65 has a nut 67 threaded thereon adapted to engage the outer surface of the main body 15 of the drill bit.

In assembling the parts of the tool, each spring 31, with its inner ends engaging the base 60 of the spring seat 61, is first placed within the socket 32, with the spring in uncompressed condition (see Fig. 7). The shank 64 of the bolt, with the nut 67 disposed thereon, is then inserted through the body hole 66 and threaded into the bore 63 of the retainer, whereupon the nut 67 can be turned on the shank 64 and caused to bear against the exterior of the body 15. Continued rotations of the nut in a right hand direction (assuming the threads to be right hand) causes the shank 64 of the bolt to be threaded outwardly of the nut and body, moving the spring retainer 61 with it and shortening or contracting the spring 31. The spring can be compressed in this manner to a solid height, if desired, as illustrated in Fig. 8.

Following compression of the springs to their full solid height, they are retained in such compressed condition by the bolt and nut device 61, 67, whereupon the guide washer 40, retractor spring 38 and mandrel 11 are inserted into the hexagonal socket 15a of the body 15, with the lower tubular portion 35 of the mandrel and its lock 47 disposed within the transverse body slot 15c. Thereafter, the cutter supporting member 19, with the cutters 25 mounted thereon, may be placed in the slot 15c, with their arms 30 disposed in alignment with the springs 31 and spring retainer 61. The hinge pins 21 may now be placed through the arms 20 defining the transverse slot 15c and secured in place. The cutters 25 and the lower portions of the cutter supporting member 19, on which the cutters are mounted, are moved inwardly, as permitted by the positioning of the lock portion 47 of the mandrel within the supporting leg recesses 36, and the latch plate 45 placed on the hooked ends 43 of the hooks 42, thus insuring that the supporting members will be retained in their innermost positions. With the plate in place, each bolt may be rotated in a counterclockwise direction, to unscrew its shank 64 from the spring retainer 61 and allow the spring 31 to partially expand, forcing the spring retainer 61 against the cutter supporting arm 30, which tends to swing the arms inwardly and the leg 23 of the cutter supporting member 19 outwardly, as described above. However, such expansion tendency is resisted and prevented by the latch plate 45.

The bolts 65 with the nuts 67 thereon are completely unthreaded from the spring retainers 61 and removed from the bit. The bit is then completely assembled. If it is desired to easily dismantle the bit, it is only necessary to reinsert the bolts 65 with the nuts 67 threaded thereon through the body holes 66 and thread them into the spring retainers 61, whereupon the nuts 67 can be tightened to feed the bolts outwardly and recompress the springs 31, allowing the hinge pins 21 to be removed and the cutter supporting members 19 moved downwardly and laterally outward from the body slot 15c. If desired, disassembly can take place without use of the bolts, since it is only necessary to remove the hinge pin 21 and move the cutter supporting members 19 in a downward and outward direction, the cutter arms 30 readily sliding off the spring retainers 61. However, if a new set of cutter supporting arms 19 are to be mounted in the bit body 15, as at the drilling rig, it is desirable to recompress the springs 31 in effecting dismantling of the tool through use of the bolts, since the springs can remain in such compressed condition during assembly of the new set of cutter supporting members 19 within the bit body 15.

It is apparent that a drill bit and method of assembling it has been provided, in which assembly of the cutter supporting members and their associated parts can be accomplished very readily through the simple expedient of utilizing a nut and bolt device, coupled with the usual wrenches ordinarily available wherever the assembling or dismantling operation is to occur. The spring 31 can be compressed and released very readily through the mere action of rotating the nut or bolt. In addition, the spring seat arrangement helps to retain the helical spring centered and in proper operating position within its socket and with respect to its associated cutter arm.

Having thus described my invention, what I claim and desire to secure by Letters Patent is:

1. A rotary well drilling bit, including a main body, cutter means mounted on said body for lateral movement with respect to said body, spring means engaging said body, spring retainer means engaging and located between said spring means and cutter means, said spring means acting through said retainer means to urge said cutter means laterally outward of said body, said retainer means and body having substantially aligned bores to permit a tool to be inserted through said body bore and into the bore of said retainer means to engage said retainer means to move said retainer means toward said body and compress said spring means.

2. A rotary well drilling bit, including a main body, cutter means mounted on said body for lateral movement with respect to said body, spring means engaging said body, spring retainer means engaging and located between said spring means and cutter means, said spring means acting through said retainer means to urge said cutter means laterally outward of said body, said retainer means having a threaded bore and said body having a bore in substantial alignment with said threaded bore to permit a threaded tool to be inserted through said body bore into said threaded bore to engage said retainer means to move said retainer means and compress said spring means.

3. A rotary well drilling bit, including a main body having a transverse bore, cutter means pivotally mounted on said body for lateral movement with respect to said body and having an upwardly extending arm and a depending leg, a spring bearing against said body in substantial alignment with said bore, a spring retainer engaging and located between said spring and arm, said retainer being in alignment with said bore and having means thereon for engagement with a tool insertable through said body bore to be moved laterally outward of said body by said tool to compress said spring between said retainer and body.

4. The method of assembling an expansible rotary drill bit, which includes providing a main bit body having a hole therein, inserting a spring and spring retainer in said body with one end of said spring bearing against said body, said retainer having a bore therein which is placed in substantial alignment with said hole, inserting a tool through said hole and into said bore to move said retainer and compress said spring against said body, mounting a cutter device in said body adjacent said retainer, and removing said tool to release said retainer and allow said spring to press said retainer against said cutter device.

5. The method of assembling an expansible rotary drill bit, which includes providing a main bit body having a hole therein, inserting a spring and spring retainer in said body with one end of said spring bearing against said body and its other end against said retainer, said retainer having a threaded bore therein which is placed in substantial alignment with said hole, inserting a threaded tool through said hole and threading it into said bore, rotating a nut device threaded on said tool and bearing against said body to cause outward feeding of said tool and compression of said spring between said retainer and body, mounting a cutter device in said body adjacent said retainer, and removing said tool from said threaded bore to release said retainer and allow said spring to press said retainer against said cutter device.

6. A rotary well drilling bit, including a main body, cutter means mounted on said body for lateral movement with respect to said body, spring means engaging said body, the axis of said spring means being transversely of the axis of said body, spring retainer means engaging and located between said spring means and cutter means, said spring means acting through said retainer means to move said cutter means laterally outward, said retainer means and body having substantially aligned bores disposed transversely of the axis of said body to permit a tool to be inserted through said body bore and into the bore of said retainer means to engage said retainer means to move said retainer means laterally outward toward said body and compress said spring means.

7. A rotary well drilling bit, including a main body, cutter means mounted on said body for lateral movement with respect to said body, spring means engaging said body, the axis of said spring means being disposed transversely of the axis of said main body, spring retainer means engaging and located between said spring means and cutter means, said spring means acting through said retainer means to move said cutter means laterally outward, said retainer means having a threaded bore and said body having a bore in substantial alignment with said threaded bore, the axis of each bore being disposed transversely of the axis of the main body, said body bore being larger than said threaded bore to permit a threaded tool to be inserted through said body bore into said threaded bore to engage said retainer means to move said retainer means outwardly toward said body to compress said spring means.

8. A rotary well drilling bit, including a main body, cutter means mounted on said body for lateral movement with respect to said body, spring means engaging said body, the axis of said spring means being disposed transversely of the main body axis, a spring retainer separate from said cutter means and provided with a base portion engaging and located between said cutter means and spring means, said retainer having a guide portion projecting within said spring means, said spring means acting through said retainer base portion to move said cutter means laterally outward, said retainer having a threaded bore and said body having a bore in substantial alignment with said threaded bore, said bores having their axes disposed transversely of the axis of the main body, said body bore being larger than said threaded bore to permit a threaded tool to be inserted through said body bore into said threaded bore to engage said retainer to move said retainer outwardly in order to compress said spring means between said retainer and body.

9. A rotary well drilling bit, including a main body having a transverse bore, cutter means pivotally mounted on said body and having an upwardly extending arm and a depending leg, a spring bearing against said body in alignment with said bore, a spring retainer engaging and located between said spring and arm, said retainer having a threaded bore in alignment with said body bore, said body bore being larger in cross-sectional area than said threaded retainer bore.

10. A rotary well drilling bit, including a main body having a transverse bore, cutter means pivotally mounted on said body and having an upwardly extending arm and a depending leg, a helical spring bearing against said body in alignment with said bore, a spring retainer provided with a base portion engaging and located between said spring and arm, said retainer having a guide portion projecting within said spring substantially coaxially thereof, said retainer having a threaded bore in alignment with said body bore, the body bore being larger in cross-sectional area than said threaded bore.

ARCHER W. KAMMERER.

REFERENCES CITED

The following references are of record in the file of this patent:

UNITED STATES PATENTS

| Number | Name | Date |
|---|---|---|
| Re. 18,473 | Hazlett | May 17, 1932 |
| 465,103 | Wegner | Dec. 15, 1891 |
| 789,929 | North | May 16, 1905 |
| 807,826 | Irvine | Dec. 19, 1905 |
| 1,031,628 | Delmore | July 2, 1912 |
| 1,097,975 | Hassler | May 26, 1914 |
| 1,133,481 | Lego | Mar. 30, 1915 |
| 1,183,630 | Bryson | May 16, 1916 |
| 1,369,959 | Booker | Mar. 1, 1921 |
| 1,459,692 | Prescott | June 19, 1923 |
| 1,583,460 | Hansson | May 4, 1926 |